(12) United States Patent
Ross

(10) Patent No.: US 6,168,185 B1
(45) Date of Patent: Jan. 2, 2001

(54) AIRBAG MODULE

(75) Inventor: Hubert Ross, Oberursel (DE)

(73) Assignee: Breed Automotive Technology, Inc., Lakeland, FL (US)

( * ) Notice: Under 35 U.S.C. 154(b), the term of this patent shall be extended for 0 days.

(21) Appl. No.: 09/226,403

(22) Filed: Jan. 6, 1999

(30) Foreign Application Priority Data

Jan. 14, 1998 (DE) .............................................. 198 01 125

(51) Int. Cl.⁷ .................................................. B60R 21/16
(52) U.S. Cl. ...................................................... 280/728.2
(58) Field of Search ............................ 280/728.2, 728.1, 280/740, 742, 743.1

(56) References Cited

U.S. PATENT DOCUMENTS

| | | | |
|---|---|---|---|
| 5,062,664 | 11/1991 | Bishop et al. | ........................ 280/743 |
| 5,172,933 | * 12/1992 | Strasser | ................. 280/740 |
| 5,332,259 | 7/1994 | Conlee et al. | ........................ 280/738 |
| 5,833,266 | * 11/1998 | Bartoldus et al. | ................. 280/743.1 |
| 5,836,607 | * 11/1998 | Wallner | ............................. 280/728.2 |
| 5,899,485 | * 5/1999 | Folsom et al. | .................... 280/728.2 |
| 6,022,043 | * 2/2000 | Harnisch et al. | ................. 280/728.2 |
| 6,056,313 | * 5/2000 | Lutz et al. | ........................ 280/728.1 |

FOREIGN PATENT DOCUMENTS

| | | |
|---|---|---|
| 4340999A1 | 6/1995 | (DE) . |
| 295 13 565 U1 | 1/1996 | (DE) . |
| 19622320A1 | 1/1997 | (DE) . |
| 631909B1 | 1/1995 | (EP) . |

* cited by examiner

*Primary Examiner*—Kevin Hurley
*Assistant Examiner*—Kevin McKinley
(74) *Attorney, Agent, or Firm*—L. R. Drayer

(57) ABSTRACT

The invention relates to an airbag module for vehicles, particularly for installation in a seat of a vehicle. The airbag module has a support with components for fastening the total airbag system to the vehicle and for accommodating the gas generator as well.

10 Claims, 2 Drawing Sheets

AIRBAG MODULE

FIELD OF THE INVENTION

The present invention relates to an airbag module for vehicles.

BACKGROUND OF THE INVENTION

The arrangement of an airbag module in a vehicle usually requires the use of several individual components. Thus, for instance, the gas generator is arranged in the housing of an airbag module by using individual components, generally in form of a flanged joint. Additional parts are required for arranging the housing in the vehicle and also for arranging the airbag and other parts.

It is the object of the invention to provide an airbag module for arrangement in a vehicle, in particular in a vehicle seat, whereby its manufacturing is less expensive and the number of components, the weight and the time for assembly can be reduced at the same time.

SUMMARY OF THE INVENTION

It is the basic gist of the invention to provide a support having several functions by serving as part of the housing for accommodating the gas generator and for arranging the airbag and the cover enclosing said airbag, and which is finally also suited for being mounted in the vehicle. Thus, it is possible to considerably reduce the number of components of the airbag module and to thereby reduce the manufacturing costs. Another advantage is the reduction of weight and a significant saving of time for the assembly. The support being an integral unit is provided with components for fastening the complete airbag module to the vehicle and with components for accommodating the gas generator. Moreover, the support includes components for installing the airbag and the cover enclosing the gas generator and the airbag. The support is advantageously made of light metal such as aluminum, magnesium or synthetic material and can be cast, deep drawn or manufactured in any other usual manner as an integral component.

The components for fastening the airbag module to the vehicle can thereby consist of ends protruding or overhanging from the support, wherein the ends serve as mounting flanges and have passageways to accommodate fastening means, for example, in form of a screw. The support as such can thereby by provided with components used to mount the complete airbag module in the vehicle. An easy way of mounting the airbag module is provided by the passageways allowing the passage of fasteners for fastening the airbag module to the vehicle. In dependence on the required special situation and mounting sites the ends serving as mounting flanges can be designed individually.

The component for accommodating the gas generator can be a clamping flange for receiving the gas generator on one hand, and a holding flange on the other hand, which again is provided with components for passing through a mounting bolt disposed at the gas generator or a second clamping flange, respectively. By providing a clamping flange and a holding flange the gas generator can be fastened to the support at two points so as to provide a secure positioning. In case the gas generator is provided with a mounting bolt the passageway can be a hole through which the mounting bolt extends, or a groove being open towards the top, into which the mounting bolt can be pushed. For securing the facility a screw nut can be screwed on, or, if the mounting bolt has no screw thread, at least a securing ring can be applied.

It is useful to provide the end of the gas generator nearest the holding flange, which end comprises the mounting bolt, wherein the clamping flange encloses the section of the other end of the gas generator. The enclosure of the gas generator by the clamping flange is obtained by the clamping flange having a recess into which the gas generator can be pushed or inserted.

The clamping flange is advantageously provided with elastic fingers adjacent to the circumference of the gas generator. Possible manufacturing tolerances can be compensated by the elastic fingers, and they particularly guarantee a secure contact between the gas generator and the clamping flange and thus the complete support without producing clattering noises.

The holding flange can expediently extend towards the gas generator for partially enclosing said gas generator in the area of its end, in which the gas outlet openings of the gas generator are disposed, in a contact-free manner. The gas outlet openings are enclosed by the so formed holding flange in a U-shaped manner, wherein the area towards the direction deployment of the airbag is omitted. If the gas outlet openings of the gas generator are not provided in the area of one end of the gas generator, but rather in the center of the gas generator, the correspondingly designed holding flange must then be designed correspondingly far in the longitudinal direction of the gas generator so as to enclose in this case still part of the gas outlet openings. Such a configuration of the holding flange serves to direct the flow of gas emerging from the gas generator and can insofar also be called a diverting element. Such an embodiment particularly prevents the airbag from contacting very hot gas in the area of the outlet openings, which protects the airbag from damage. To enclose or divert the flow of gas in the direction of deployment of the airbag is not necessary, since in this area the airbag immediately moves away from the gas outlet openings whereas it is almost directly adjacent the gas outlet openings in the other areas after its deployment.

In the support area, where the gas generator and the support are placed opposite each other, elastic members can be provided for producing a retention force which has an effect on the gas generator perpendicular to the axis thereof after the gas generator is installed in the flanges for securing its position. The elastic members are thereby also components of the support, wherein the elastic members extend away from the support towards the gas generator. After installing the gas generator the elastic members are pressed down so as to produce the mentioned additional retention force. The arrangement of the elastic members can be omitted if clamping flanges are provided, which have elastic fingers provided adjacent the circumference of the gas generator. If such elastic fingers are, however, not provided at the clamping flanges, the elastic members disposed at the support will advantageously be used for guaranteeing the desired secured positioning and for avoiding especially also clattering noises.

For additional securing the positioning and for avoiding clattering noises between the gas generator and the support, an elastic overhang can be provided at the support in the clamping flange area, into which overhang one edge of the gas generator can be clipped or inserted, for additionally securing the positioning in the case of high forces in axial direction of the gas generator. The flange arranged at the opposite end of the elastic overhang then no longer needs to hold the forces effective towards the elastic overhang alone and is thereby relieved.

Especially for saving material and weight the support encloses merely part of the circumference of the gas generator and is spaced from the gas generator with the exception of the area of the flanges or elastic fingers, respectively, for largely avoiding an unnecessary, possibly noise creating contact between the gas generator and the support. It is particularly feasible to design the support in a very slim manner because the support may be soft enough for bending purposes in the longitudinal axis direction of the gas generator. By arranging the gas generator at the support the eventually desired rigidity of the total airbag module is obtained, which is required especially when the airbag is deployed. In other words, with a load vertical to the longitudinal axis of the gas generator, the entire airbag module is supported by the gas generator that due to its configuration has a sufficiently high rigidity.

In the installed state the support is expediently provided in the vehicle so that the area of the gas generator not being enclosed by the support is directed towards the direction of deployment of the airbag.

The facilities for arranging the airbag and the cover can advantageously consist of projecting pins provided at the support on the side facing away from the gas generator, wherein the pins pass through the airbag and, if possible, the cover. In contrast to what was previously usual, this arrangement entails that the airbag is held merely through form closure and is not clamped, i.e. it is disposed by means of frictional connection. The airbag can expediently be designed so as to overlap in the area of the pins with the result that an additional sealing level is obtained in said area for preventing too large amounts of gas from escaping from the airbag in an undesired way. It is not absolutely required that the pins also pass through the cover. Alternatively, the cover in said area can also be designed so as to accommodate the individual pins, i.e. fan-shaped protuberances are provided for the pins in the cover which can accommodate the pins so that the cover can thereby be disposed closer to the support in the desired way, however, the pins do not pass through the cover.

The cover expediently has additional recesses for passing through the elements for fastening the total airbag module to the vehicle, wherein the cover encloses the remaining total support, the gas generator as well as the folded airbag. In the case of the cover it can also be an advantage if it overlaps in the area of the passage of the above mentioned pins and especially also of the mounting flanges.

The ends can be arranged at the support extending towards the direction of deployment of the airbag, which ends can be designed as additional and/or as projecting parts of the clamping flange for serving the airbag as a bearing surface with a sealing effect during inflation. It is exactly in the area between the gas generator and the airbag where basic problems occur in view of the tightness of the airbag. If the airbag is, however, permitted through specific configurations, as was mentioned above, to fit closely to specific surfaces, a sufficient sealing effect can be produced in said area, which prevents gas from escaping from the airbag all of a sudden and in large amounts.

The support can, moreover, be provided with facilities for strain relieving the electrical supply line leading to the gas generator, preferably at the elements for fastening the airbag module to the vehicle. These strain-relief facilities advantageously have the form of one or several elastic clamping fingers into which the electrical supply line can be clamped.

BRIEF DESCRIPTION OF THE DRAWINGS

The airbag module according to the invention is hereinafter explained in more detail with refence to the drawings in which.

DETAILED DESCRIPTION OF THE DRAWINGS

Figure 1:
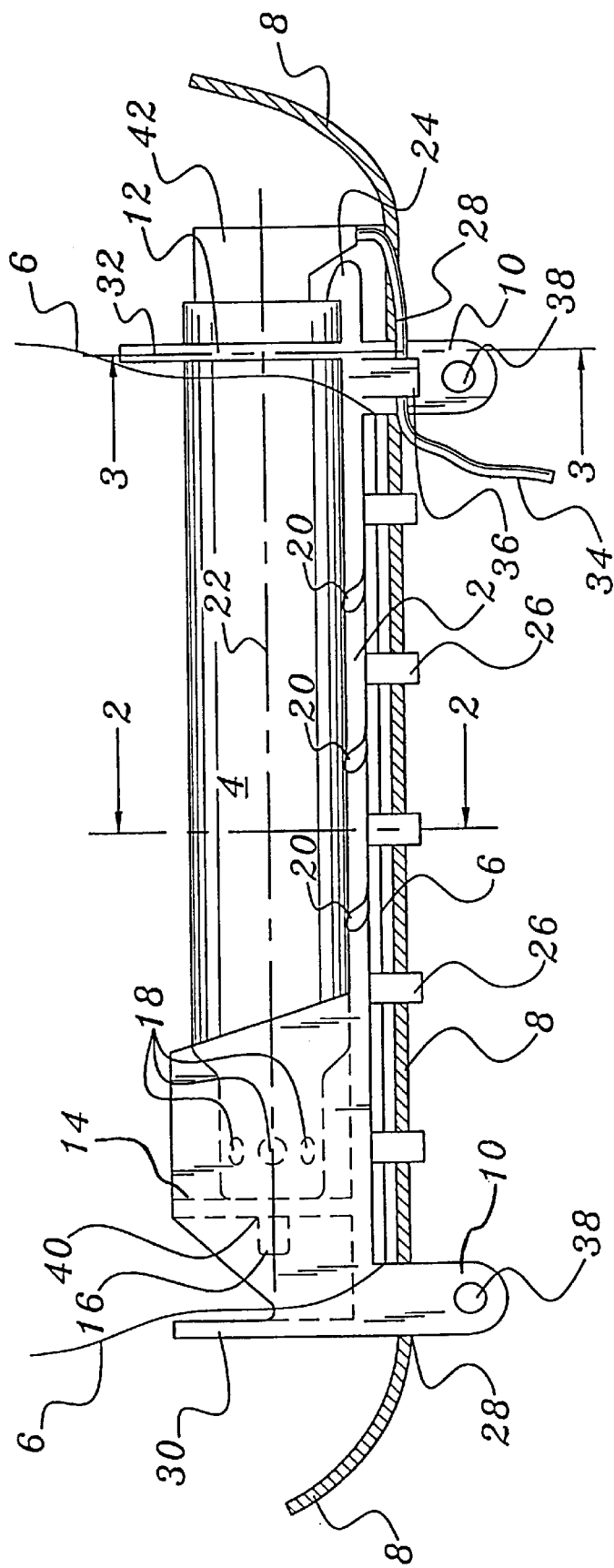
FIG. 1 shows a side view, partially in section, of an airbag module with a gas generator installed in the support.

FIG. 1 shows a side elevation view, partially in section, of an airbag module according to the invention, comprising a support 2, a gas generator 4, an airbag 6 and cover 8 enclosing the before mentioned parts. The airbag 6 and the cover 8 are shown only partly, wherein the airbag 6 is illustrated in a deployed state.

The airbag module replaces the previously known housing by means of support 2, which is provided with additional components, such as for accommodating the gas generator 4 or the airbag 6, such that the support can be manufactured as an integral component. The airbag module has utility in vehicles in the broadest sense, i.e. not only motor vehicles, but also rail vehicles or other means of transportation in which an airbag restraint system is useful. The airbag module described herein is suited especially for installation in a seat of such a vehicle.

Figure 3:
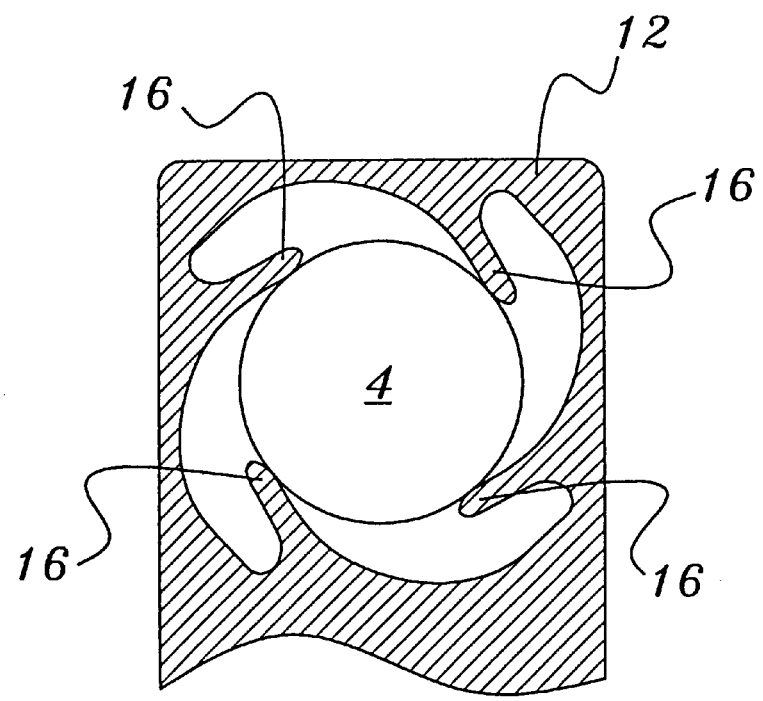
FIG. 3 shows a cross-section through the airbag module along section line 3—3 of FIG. 1.

For arrangement in a vehicle the support 2 is provided with components for arranging the airbag module in the form of ends serving as mounting flanges 10. The ends form an integral part of the support and have passageways 38 through which fasteners can be passed to fasten the airbag module to a vehicle. Furthermore, components for securing the gas generator 4 are provided, again as an integral part of the support 2. Said components are a holding flange 14 and a clamping flange 12. The holding flange 14 has a recess 40, which is preferably in form of a hole, but which can also be a groove open towards the top. A mounting bolt 16, arranged at one end of the gas generator 4, is inserted in said recess. For additionally fastening the gas generator 4 to the holding flange 14 a non-illustrated screw nut or a securing ring can be used, which is screwed onto the mounting bolt 16 thereby drawing the gas generator 4 towards the holding flange 14 and securing it. The other end of the gas generator 4 is enclosed by a clamping flange 12. The gas generator 4 is thereby pushed into the clamping flange. Apart from airbag 6, gas generator 4 and cover 8, only the support 2 is finally required for providing an airbag module that is ready to be mounted in a vehicle As is shown in FIG. 3, The clamping flange 12 is provided with elastic fingers 16 that contact the circumference of gas generator 4. Said elastic fingers compensate for possible manufacturing tolerances and enable an arrangement of the gas generator 4 with the clamping flange 12 to reduce the generation of noise in the vehicle.

As can, moreover, be inferred from FIG. 1, an electrical connector 42 is disposed at the end of the gas generator 4 nearest the clamping flange 12, which electrical connector is connected to an electrical supply line 34. The electrical supply line 34 is clamped into a clamping member 36, provided at the mounting flange 10, for the purpose of strain relief. Furthermore, an elastic overhang 24 in the form of a clamping nose is provided at this end of the gas generator 4. The elastic overhang 24 is thus adjacent the outer edge of the gas generator 4 in a way that the elastic overhang 24 can take a longitudinal force having an effect thereon in an axial direction of the gas generator 4, thereby relieving holding flange 14, which then no longer has to hold the total before mentioned longitudinal force. Elastic members 20 serve as alternatives for securing the positioning which, being an integral component of the support 2, extend from said support 2 towards the gas generator 4. When installing the gas generator 4, the elastic members 20 are pressed down against their initial tension thereby producing a holding force with an effect perpendicular to the longitudinal axis 22 of the gas generator 4, with which holding force the use of the elastic fingers 16 of clamping flange 12 may no longer required. The elastic members 20 also reduce noise generated between the gas generator 4 and the support 2.

At its lower area facing away from the gas generator 4, the support 2 comprises ends in the form of pins 26 extending away from the gas generator 4. Several pins 26 can thereby be arranged in the longitudinal axis direction of support 2 or gas generator 4, respectively. The airbag is provided with recesses which are complementary to the pins 26 so that the airbag 6 encloses the support 2 in its lower area and is arranged merely in a form fit manner and not, as was previously the case, in a nonpositive manner due to the recesses of airbag 6 in the area of pins 26 at support 2.

In the area of the mounting flanges 10 the airbag 6 extends towards the gas generator 4, wherein the support 2 or the gas generator 4, respectively, extend through the airbag 6. The airbag 6 is arranged in the area of the clamping flange 12 such that the end of gas generator 4 contacting the electrical connector 42, passes through the airbag 6, wherein even the clamping flange 12 is arranged outside the airbag 6. On the other side the holding flange 14 pass through the airbag 6. In the direction of deployment of the airbag 6 the clamping flange 12 is configured longer than required for its original function thereby having an end 32. At the opposite side such an end 30 is provided at the mounting flange 10, wherein said end 30 is also positioned outside the airbag 6. During inflation of the airbag 6 it becomes adjacent the ends 30, 32 which then serve as bearing surfaces having a sealing effect, thereby preventing gas from escaping from the airbag 6 due to the airbag being adjacent the corresponding walls at the ends 30, 32.

For avoiding a direct contact between the hot gas emerging from the gas generator 4 and the airbag the holding flange 14 has a specific configuration. Openings 18 for the gas exiting from gas generator 4 are provided in the region of the holding flange 14. In addition to its primary function the holding flange 14 is configured to extend in a longitudinal direction of the gas generator 4 for partly enclosing the area of the gas generator 4 which contains the gas outlet openings 18. For this purpose the holding flange 14 need not be configured to extend over the total length of the gas generator 4, but only until it also encloses at least part of the gas outlet openings 18. Thus, the holding flange 14 also has the function of diverting the flow of gas from the gas generator 4 and can also be called a diverting element. In cross-section the holding flange 14 is U-shaped in the area of its longitudinal extension and only omits the area towards the direction of deployment of the airbag.

Finally, the cover 8 is illustrated, which is equally provided with recesses in the area of the pins 26 of support 2, wherein the pins 26 can pass through the cover. Additional openings are provided in the cover 8 in the area of the mounting flanges 10 so that the mounting flanges 10 can also extend through the cover.

Figure 2:
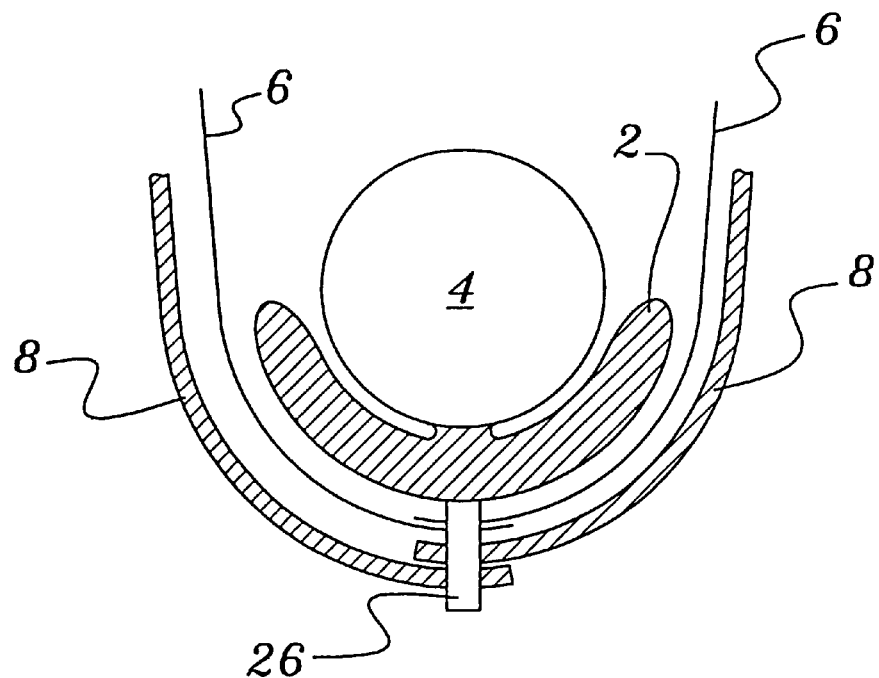
FIG. 2 shows a cross-section through the airbag module along section line 2—2 of FIG. 1.

FIG. 2, which is a section at line 2—2 of FIG. 1, shows the configuration of the support 2, the airbag 6 and the cover 8 in more detail. The support 2 partially encloses the gas generator 4, wherein the support 2 can also be designed as some form of shell in which the gas generator 4 is totally contained. The pins 26 pass through the airbag 6 and the cover 8. The airbag 6 and the cover 8 are configured to form two layers in the area of the pins so that the airbag 6 has an additional sealing effect in this area. In view of the cover said area is obvious for being chosen due to technological manufacturing purposes as it is possible to exactly position the cover 8 with respect to the support 2. The forces affecting the cover 8 can then partially be absorbed by the pins 26 thereby preventing the situation where the cover usually consisting of two half shells is damaged or bursts at corresponding seams.

Obviously numerous modifications can be made to the invention without departing from its scope as defined in the appended calims.

What is claimed is:

1. An airbag module comprising:
    (a) an airbag;
    (b) a tubular gas generator;
    (c) a support accommodating the gas generator as well as the airbag;
    (d) a cover enclosing the gas generator and the airbag;
    (e) a holding flange securing one end of the gas generator to the support; said holding flange comprising a device for passing through a mounting bolt disposed at the gas generator, wherein the holding flange extends in a longitudinal direction from the end of the gas generator to a location along the gas generator so as to include gas outlet openings, said holding flange partly encloses the circumference of the gas generator serving to direct the flow of gas from the gas generator to the airbag;
    (f) a clamping flange securing the other end of the gas generator to the support; and
    (g) a plurality of projecting pins arranged in the longitudinal axis direction of the support facing away from the gas generator, wherein the pins extend through the airbag.

2. The airbag module of claim 1 wherein the element for fastening the complete airbag module to the vehicle comprises ends protruding or overhanging form support, wherein the ends serve as mounting flanges and have passageways for passing therethrough a fastener.

3. The airbag module of claim 1 wherein the clamping flange has elastic fingers that contact the circumference of the gas generator.

4. The airbag module of claim 1 wherein in the region of the support, in which the gas generator and the support are opposite each other, one or several elastic members are arranged for producing a retention force which has an effect on the gas generator perpendicular to the longitudinal axis thereof.

5. The airbag module of claim 1 wherein the support further comprises an elastic overhang in the area of the clamping flange into which the one edge of the gas generator can be clipped for producing a holding force in axial direction of the gas generator.

6. The airbag module of claim 1 wherein the support merely partly encloses the circumference of gas generator and is spaced from the gas generator except for the area of flanges or the fingers, respectively.

7. The airbag module of claim 1 wherein the projecting pins extends through the cover.

8. The airbag module of claim 1 wherein the airbag is overlapped in the area of the projecting pins.

9. The airbag module of claim 2 wherein the clamping flange has elastic fingers that contact the circumference of the gas generator.

10. The airbag module of claim 2 wherein the outlet openings of the gas generator are arranged with the holding flange in a contact-free manner.

* * * * *